May 27, 1969     F. ACHELPOHL     3,446,121
APPARATUS FOR PULLING OPEN THE ENDS OF TUBE SECTIONS
OF PLASTIC MATERIAL SHEETING
Filed May 15, 1967     Sheet 2 of 4
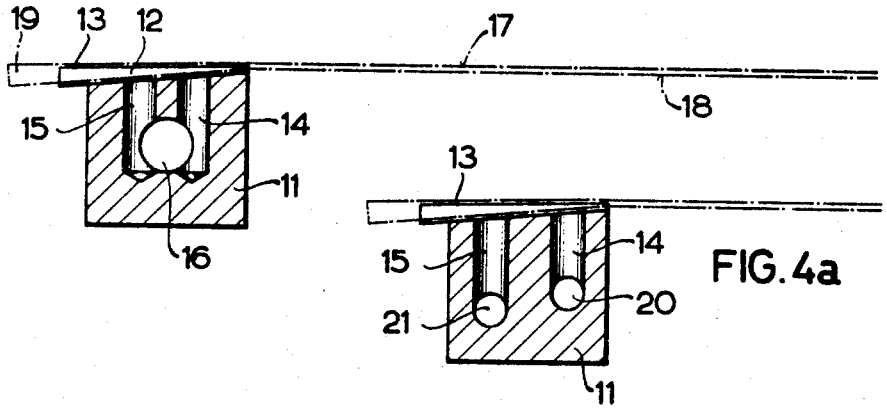
FIG. 4
FIG. 4a
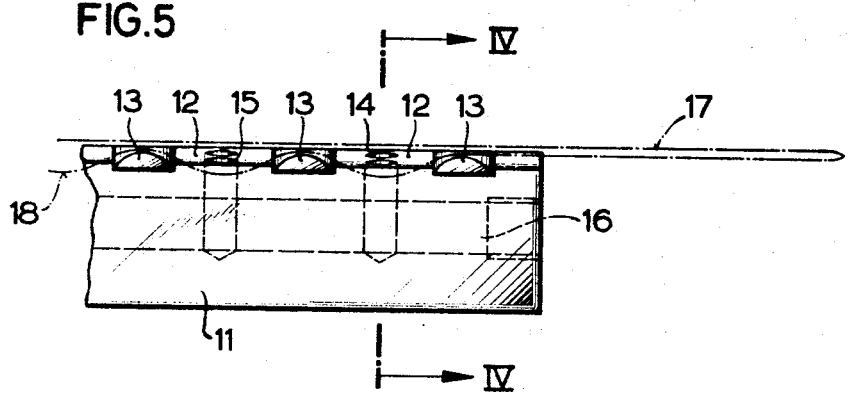
FIG. 5
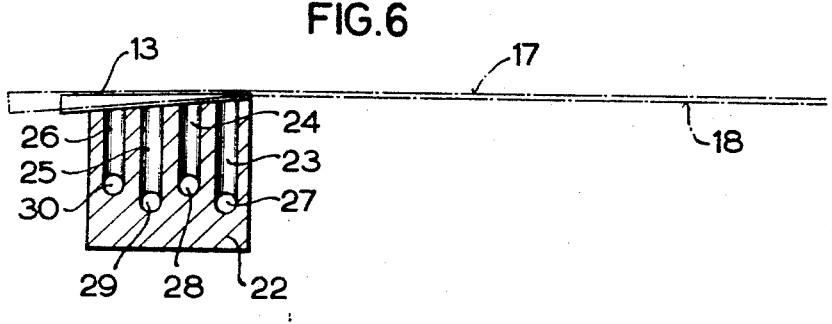
FIG. 6

United States Patent Office 3,446,121
Patented May 27, 1969

3,446,121
APPARATUS FOR PULLING OPEN THE ENDS OF TUBE SECTIONS OF PLASTIC MATERIAL SHEETING
Fritz Achelpohl, Lengerich, Westphalia, Germany, assignor to Windmoller & Holscher, Lengerich, Germany
Filed May 15, 1967, Ser. No. 638,278
Claims priority, application Germany, May 18, 1966, W 41,614; Apr. 24, 1967, W 43,835; Apr. 25, 1967, W 43,839
Int. Cl. B31b 1/76; B65b 43/36
U.S. Cl. 93—28                                         13 Claims

ABSTRACT OF THE DISCLOSURE

Two vacuum tools, preferably vacuum beams, revolve in opposite senses and have vacuum openings. The lower vacuum tool has waves, which extend at right angles to the open edge of the tube section. The vacuum openings of this vacuum tool are arranged in the wave troughs. The vacuum openings of the upper vacuum tool are in registry with the wave crests of the lower vacuum tool.

---

For pulling open the ends of tube sections which are to be processed into bags, vacuum beams are usually employed, which are connected to vacuum lines and provided with mutually opposed vacuum openings in their smooth suction surfaces facing each other. Each of these beams is revolved by means of two links in a direction which is opposite to the revolution of the other beam. Such pulling-open devices are generally satisfactory in operation but have proved inadequate for pulling open the ends of tube sections consisting of plastics material sheeting if the two plies of tubing are in snug contact with each other. For an opening of the tube ends, air must enter between the plies of the tubing at a speed which is determined by the feeding and pulling-open tools. When the plies of the tubes of plastics material sheeting, which plies are smooth and impermeable to air, are in snug contact with each other, such an ingress of air requires a relatively long time because in such case the air can initially enter between the plies of sheeting only through the minute capillary openings always existing between the plies of sheeting material. If the vacuum beams are moved apart at relatively high speed, such as is essential for an economic manufacture, the required amount of air cannot flow in quickly enough so that the sheeting is torn from one of the vacuum beams and the tube section adheres in an unopened condition to the other vacuum beam. This must necessarily result in rejects and in other troubles in operation.

It is an object of the invention to provide a pulling-open apparatus which enables a fast and reliable pulling open even with tube sections of plastics material sheeting in which the plies snugly contact each other and in most cases firmly adhere to each other owing to an electrostatic charge. In an apparatus for pulling open the ends of tube sections of plastics material sheeting, which apparatus comprises two vacuum tools, preferably vacuum beams, which revolve in opposite senses and have vacuum openings, this object is accomplished according to the invention in that the lower vacuum tool has waves, which extend at right angles to the open edge of the tube section, the vacuum openings of this vacuum tool are arranged in the wave troughs, and the vacuum openings of the upper vacuum tool are in registry with the wave crests of the lower vacuum tool. This design ensures that the lower ply of the tube section will be sucked into the wave troughs of the lower vacuum tool and the upper ply will be held to the upper vacuum tool when the vacuum beams are closed so that this undulated shape of the lower ply of the tube will result in channels, which are formed between the two plies and through which air can readily enter when the vacuum beams are moved apart during the continued rotation of the links which carry the vacuum beams. As the waves are formed in the lower vacuum beam, which is contacted by the tube section to be opened before the cooperating vacuum beams reach their closed position, the build-up of the vacuum at the vacuum openings in the wave troughs can begin before said closed position has been reached. The staggered arrangement of the vacuum openings in the cooperating vacuum beams facilitates also the formation of the channels for the ingress of air and ensures a sucking of the upper ply by the smooth vacuum beam because this ply will necessarily firmly contact the smooth vacuum beam opposite to the wave crests whereas this is not ensured opposite to the wave troughs because the adherence of the sheeting plies to each other causes the upper ply to be slightly drawn into the wave troughs together with the lower ply and in any case prevents a firm contact of the upper ply with its vacuum beam.

It is also desirable according to the invention if the vacuum line for the undulated vacuum beam is opened before the vacuum line for the smooth vacuum beam. As a result, the ply of the tube section contacting the undulated vacuum beam is drawn into the waves before the smooth vacuum beam sucks the ply in contact with it. This will facilitate the separation compared to an operation in which the two vacuum lines are opened simultaneously or the vacuum line for the lower vacuum beam is opened after that for the upper vacuum beam. Tests have shown that particularly favorable results will be obtained if the vacuum line for the lower vacuum beam is opened when the links are at an angle of 5° before the position corresponding to the closed position of the vacuum beams and the vacuum line for the upper vacuum beam is opened when this closed position is reached.

As has already been mentioned, the invention will preferably be used with pulling-open devices which comprise two vacuum beams revolving in opposite directions. Alternatively, a smooth vacuum beam which revolves on cranks may cooperate with an undulated vacuum belt, or a smooth vacuum belt and an undulated one may be provided in a suitable arrangement.

In another embodiment of the invention, the wave troughs are progressively reduced in depth from the outer end of the lower vacuum tools, which end faces in the same direction as the open edges of the tube, to the inner end, which faces the center of the tube sections and of the machine.

With this design, the effect of the vacuum openings disposed in the wave troughs is ensured in all cases with a very high reliability although said vacuum openings are necessarily somewhat spaced from the lower ply of the sheeting tube, which ply has not yet been pulled into the wave troughs. This might sometimes give rise to trouble. With the design described above, a vacuum opening which is at the center of the vacuum beam is spaced from the extended sheeting ply by only one half of the maximum depth of the wave trough so that the reliable effect of the vacuum is much promoted. On the other hand, it is ensured that the wave trough has at the outer end of the vacuum beam the depth which is required for a reliable opening operation.

According to a further proposal of the invention, each wave trough comprises two or more vacuum openings, which are spaced along the wave trough, and the innermost of said openings with respect to the tube section has the smallest distance from the extended sheeting so that it is most reliably effective. When this vacuum opening has sucked the lower sheeting ply and has begun to separate the same from the upper sheeting ply, the lower sheeting ply approaches the next following vacuum opening and is also reliably sucked by the same and drawn into the wave trough, which is deeper adjacent to said vacuum opening, so that the desired pulling-open of the end of the tube section is reliably effected and proceeds from the inside outwardly.

In a further development of the invention, vacuum lines for the groups of vacuum openings lying on the same level in the wave troughs of the vacuum beam are provided and said lines are connected to separate vacuum sources. This arrangement will ensure that there is no equalization of pressure between the lower vacuum openings and the vacuum at the vacuum openings which have previously become effective until the sheeting has contacted the lower vacuum openings so that the sucking to the higher vacuum openings would be endangered.

According to a further proposal of the invention, a common vacuum source is used for all vacuum openings and a vacuum valve is used for delaying the application of the vacuum to the outer vacuum openings relative to the inner ones. As the vacuum openings are successively connected to the vacuum source from the inside to the outside, the same result is obtained without need for a plurality of vacuum sources as the next lower vacuum opening is not connected to the vacuum source until the preceding vacuum source has drawn the sheeting down into the wave trough.

To facilitate the manufacture of the vacuum beams having the inclined wave troughs, it is proposed according to the invention that the vacuum beam consists of a quadrangular steel section, which is beveled on the suction side in accordance with the desired reduction of the depth of the wave troughs and components which are wedge-shaped in the longitudinal direction and curved in cross-section are mounted on said steel section to form the wave crests. The wave crests may extend beyond the outer ends of the vacuum beams so that an undulation of the lower tube ply as far as to the freely protruding outer end of the tube section is achieved when tube sections are processed which have a length at the upper tolerance limit. The two vacuum beams revolving in opposite directions do not only serve to separate the two plies at the ends of the tube sections but are required to open the end of the tubing to such an extent as they continue their opposite movement that spreading tools can enter, which subsequently open the tube end completely and form it into the open end square. In this operation, the tube ends are opened as far as to the line which forms subsequently the end center line. At this line, the tube plies are held together by suitable folding blades, which have edges that define the axes about which all points of the tube sheeting would perform an opening movement along arcs of circles if the parts to be folded open were stretched. As the tube sections are continuously advanced transversely to their longitudinal axis during the opening operation in order to avoid a stoppage, the vacuum beams revolve in opposite directions about axes of two links or cranks for each beam and said axes are at right angles to the direction of movements of the tube sections so that the vacuum beams are moved in parallel in planes which are at right angles to the ends of the tube section. In this case there is no movement of the vacuum beams about the edges of the folding blades so that the tube plies sucked against the vacuum beams move relative to the latter during the opening operation. Particularly because waves are provided according to the invention in the lower vacuum beam, this relative movement between the tube ply and the vacuum beam may separate the tube sheeting from the vacuum openings disposed at the bottom of the wave troughs of the lower vacuum beam so that the opening operation is interrupted and the spreading tools cannot subsequently enter the tube end. Such disturbance might arise during the processing of tubes of sheeting having a certain thickness and would result in rejects as well as most undesired interruptions in the process, A further inaccuracy of those movements of the tube sections and suction beams which are to be coordinated is due to the fact that the tube sections are advanced at a uniform velocity in the feeding plane and the vacuum beams move at a uniform velocity along circular paths, which have the same direction as the feeding plane only at their point of tangency therewith. As the revolution proceeds from the point of tangency, that component of the circular movement which lies in the feeding direction decreases according to a cosine function. As the opening operation is continued, this results in a difference in velocity between the vacuum beam and the end of the tube section which is to be pulled open. In adverse cases, this difference may result, for the reasons described hereinbefore, in a separation of the sheeting from the vacuum beams, particularly from the undulated lower vacuum beam.

In order to ensure with the aid of means which are as simple as possible that the movement of the vacuum beams is matched in direction and velocity as closely as possible to the movement of the tube plies of the tube at the end which is to be opened, a development of the invention resides in that the axes of the links or cranks for imparting parallel movements to the vacuum beams are oblique to the transverse direction of the feeding plane and the vacuum beams are driven at an angular velocity which varies in such a manner that their component of velocity in the direction of travel of the workpieces is substantially constant during the opening operation. The obliquity and the varying drive movement, which results in a uniform movement of the projection of the vacuum beams on the feeding plane during the opening operation, have the result that the movements of the vacuum beams and of the ends of the tube sections during their opening movement are approximately synchronized to a degree which is sufficient in practice.

In a first embodiment of the further inventive concept just described, the axes of the cranks for imparting parallel movements to the vacuum beams remain in planes that are parallel to the feeding plane and are given such an oblique orientation in such planes that the vacuum beams are no longer held and moved parallel to the end edges of the tube section but a component toward the folding blades is imparted to the vacuum beams. As a result, the vacuum beams have during the opening movement a component in the direction of travel and a component toward the transverse center line of the bag tube. The latter component depends on the obliquity. This results already in a substantial matching of the movements of the parts which effect the opening movement to the movement of the parts which are being opened.

In this connection it should be pointed out that that component of the movement of the vacuum beams which is directed toward the transverse center plane of the bag tube in this embodiment fully corresponds to the degree of the obliquity at the beginning of the opening operation but progressively decreases as the opening operation proceeds. Ideally, however, the movement of the tube plies to be folded open should initially have no component in this direction and this component should progressively increase.

From a theoretical aspect, a second embodiment of the inventive concept now under discussion is more satisfactory in this connection. In this embodiment, the axes of the cranks for imparting parallel movements to the vacuum beams lie in planes that are at right angles to the direction of travel and to the feeding planes and are inclined in these planes towards the tube section so that a component of movement toward the transverse center plane of the bag tube is obtained during the opening operation and this component increases during the opening operation from zero to a maximum, which is obtained after a quarter revolution. This is better in accordance with the desired movement of the tube walls.

This embodiment is structurally more expensive than the other because in the embodiment just described different obliquities are required above and below the path of travel. In the embodiment first described it is sufficient to give the entire carrying frame for all four cranks for imparting parallel movements an oblique orientation and to drive said cranks, e.g., by two meshing bevel gears. In the last described embodiment, upper and lower parts of the frame must be arranged at different angles and driven by separate bevel gear trains. It is also much simpler structurally to provide a vertical side wall of the machine having an oblique orientation, as in the embodiment first described, than to incline a wall from the vertical, as in the embodiment last described. The deviation from the theoretically correct movement in the first embodiment is hardly significant because each tube ply is folded open by no more than 15° and all that is required is to ensure that the vacuum beam sufficiently follows the tube portions. A faster movement is not harmful because the tube plies can be upset without separating from the vacuum beams whereas they must not be elongated, of course. It is essential, above all, that the vacuum beam should perform during the opening operation as a whole a sufficiently large movement toward the transverse center plane of the tube. The time function of this movement is not significant. The obliquity can be controlled to provide for the required size of this component of the movement in the first described embodiment so that this embodiment is preferable in view of its structural advantages.

The non-uniform movement of the vacuum beams is obtained in known manner by a varying-ratio transmission which is incorporated in the drive, e.g., a sliding crank drive or a transmission comprising elliptical gears.

The invention will be explained more fully in the following description with reference to the drawing, in which a plurality of embodiments are diagrammatically shown by way of example.

FIG. 4 is a transverse sectional view taken on line IV—IV of FIG. 5 and showing a modified vacuum beam according to the invention.

FIG. 4a is a sectional view similar to FIG. 4 and shows a further modification of the vacuum beam.

FIG. 5 is an elevation showing a vacuum beam, broken away, according to another desirable embodiment of the invention.

FIG. 6 is a sectional view similar to FIG. 4 and showing a last embodiment of a vacuum beam according to the invention.

Figure 1:
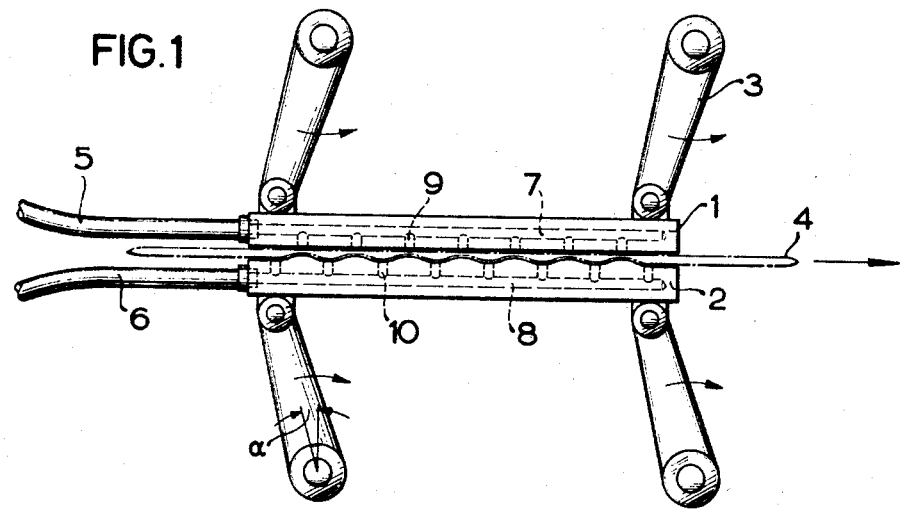
FIG. 1 shows the vacuum beams of a first embodiment shortly before the closed position together with the sheeting tube section between the beams.
Figure 2:
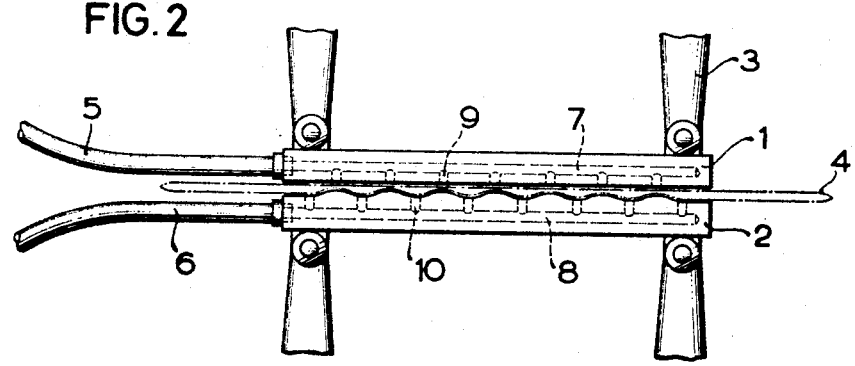
FIG. 2 shows the vacuum beams in a closed position.
Figure 3:
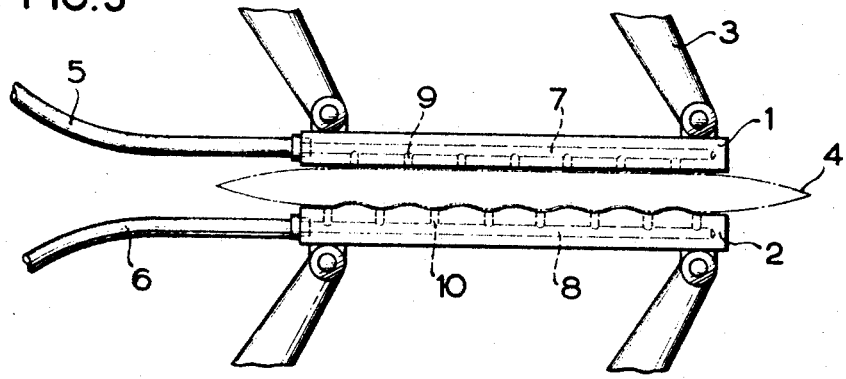
FIG. 3 shows the vacuum beams with the sheeting tube section during the opening operation.

The vacuum beams 1 and 2 shown in FIGS. 1 to 3 are secured in such a manner to the rotating links or cranks 3 that the beams are moved parallel to themselves and are moved toward each other when a sheeting tube section 4 is moved between said beams in a direction that is transverse to the longitudinal direction of said tube sections. Flexible vacuum lines 5 and 6 are connected to the vacuum beams 1 and 2, which have elongated vacuum bores 7 and 8 opening at 9 and 10. The vacuum lines 5 and 6 contain valves, which are not shown in the drawing and prevent a sucking of air during that portion of the revolution of the vacuum beams during which the latter are not effective.

As is clearly apparent from FIG. 1, the vacuum beam 2 is formed with waves, which have the same longitudinal direction as the tube section 4, i.e., at right angles to the open edge of this tube section. The vacuum bore 8 in the vacuum beam 2 communicates with vacuum openings 10, which are disposed in the troughs of the waves in its suction surface. The vacuum line 6 is suitably opened by its associated valve when the cranks or links 3 are before the upper dead center by an angle $\alpha=5°$, which is exaggerated in FIG. 1. When line 6 is thus opened, the lower ply of tube section 4 is sucked adjacent to its open end into the wave troughs so that passages are formed between the lower ply and the upper ply, which has not yet been sucker.

As soon as the closed position shown in FIG. 2 has been reached, the valve in the vacuum line 5 is also opened and the upper ply of tube section 4 is sucked by the vacuum openings 9, which are in registry with the wave crests of the vacuum beam 2. As is apparent from FIG. 2, there are distinct air inlet openings between the two plies and these air inlet openings enable a sufficient inflow of air between the two tube plies while the vacuum beams 1 and 2 are moving apart. An advanced phase of this movement is shown in FIG. 3. As a result, an adherence between the plies will be reliably avoided and the manufacturing speed will not be affected.

The vacuum beam 11 shown in FIG. 4 has transverse wave troughs 12, which uniformly increase in depth from the inside to the outside. In the present embodiment, the vacuum beam has been provided by adhering wedge-shaped pieces 13 of curved cross-section to a quadrangular steel section, which has a milled, oblique surface in accordance with the desired configuration of the bottom of the troughs. The pieces 13 constitute the crests of the waves and their length exceeds the width of the beam so that the pieces 13 protrude outwardly, as is clearly apparent in FIG. 4.

In the embodiment shown in FIGS. 4 and 5, each wave trough has two vacuum openings 14 and 15, which are connected to a common longitudinal vacuum bore 16. The sheeting tube, which is shown broken away and in phantom, has two plies 17 and 18 and for precaution its open end 19 protrudes beyond the protruding ends of the adhered pieces 13. Under the action of the vacuum openings 14 and 15, the lower tube ply 18 has already been separated from the upper tube ply 17 adjacent to the wave troughs and pulled down into the same. This process begins at the vacuum openings 14, which are closer to the stretched sheeting 18 and for this reason exert a stronger suction thereon. As the tube ply 18 has already been sucked adjacent to the vacuum openings 14, this ply approaches the vacuum openings 15, which now become effective too. In this way, the desired opening of the tube ends is reliably performed and proceeds to the forward termination of the tube end.

In the embodiment of FIG. 4a, the vacuum openings 14 and the vacuum openings 15 are connected to separate longitudinal vacuum bores 20 and 21. This enables a connection of the vacuum openings 14 and 15, which become effective in succession, to separate vacuum sources so that the vacuum openings 14 cannot suck air from the atmosphere through the vacuum openings 15 when the same are not yet covered by the sheeting. Such a sucking of air through the vacuum openings 15 would reduce the suction effect of the vacuum openings 14. On the other hand, the vacuum passages 20 and 21 can be connected to the same vacuum source and can be controlled by separate valves in such a manner that they become effective in succession. In this way, the application of the vacuum to the vacuum openings 14 and 15 can be controlled in accordance with the sucking operation in such a manner that the vacuum will not be applied to the vacuum openings 15 until the sheeting has approached the vacuum openings 15 under the action of the vacuum openings 14.

FIG. 6 shows a vacuum beam 22 which has four vacuum openings 23 to 26 per wave trough. By separate passages 27 to 30, these openings can be connected to separate vacuum sources or in succession to one vacuum source. This embodiment is somewhat more expensive but increases the reliability of the opening operation because the vacuum opening 23 which becomes effective first is very close to the extended sheeting and the other vacuum openings become effective when the effect produced by the preceding vacuum opening is still very small.

Figure 8:
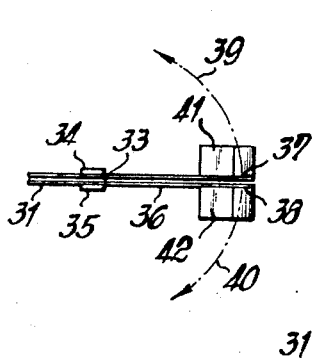
FIG. 8 is a side elevation taken opposite to the direction of travel and showing the vacuum beam of FIG. 7 without its mountings.
Figure 7:
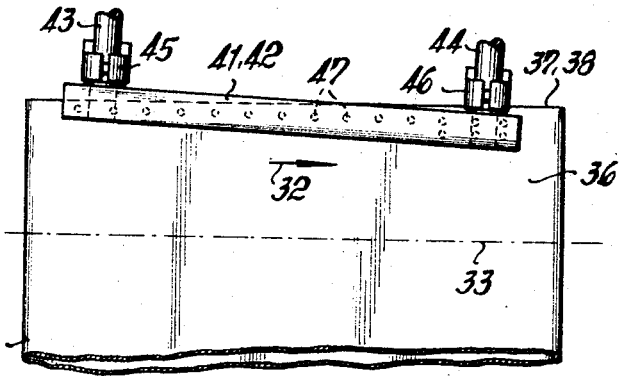
FIG. 7 shows an oblique vacuum beam according to a first embodiment of a development of the invention.

The tube section 31 is advanced in the direction of the arrow 32 transversely to its longitudinal axis and in the direction of its end edge and of the dash-dot line 33, which is parallel to said end edge and will subsequently form the end center line. The end center line 33 is defined by folding blades 34 and 35, which are illustrated in FIG. 8 and are not shown in FIG. 7. When the tube end 36 emerging from the folding blades 34 and 35 is pulled open, the edges 37 and 38 of the tube must theoretically move on arcs of circles 39 and 40, which are shown in dash-dot lines and are centered at 33. To impart to the opening vacuum beams 41 and 42 not only a movement in the direction of travel 32 and at right angles to the plane of the tube but also a component of movement toward the transverse center plane, which component corresponds to the theoretical movement of the end edges of the tube section along the arcs of circles 39 and 40, the vacuum beams as well as the shafts 43, 44 on which the links 45 and 46 for the beams are rotated have an oblique orientation so that the leading end is closer to the end center line 33. As a result, the movement performed during the opening of the tube section ends has a component toward the transverse center line of the tube. In addition to the component effecting the opening movement, there is a main component of movement in the direction of travel 32. To maintain the component in the direction of travel constant in spite of the progressive increase of the component effecting the opening movement, the drive shafts 43 and 44 are driven at a progressively increasing speed during the opening operation.

The component toward the transverse center line of the tube section is due to the obliquity and constantly decreases during the opening operation from an initial maximum. Theoretically, this movement ought to increase from zero according to a sine function. The initial excess has only an upsetting effect, which does not cause the sheeting to separate from the vacuum beam because the sheeting can readily be upset. According to the invention, the vacuum openings 47 have an oblique orientation in the vacuum beams so that these openings extend parallel to the end edges of the tube section and uniformily open the tube plies throughout the length of the beam.

Figure 9:
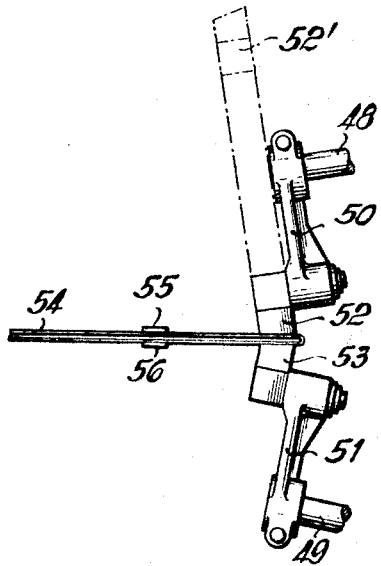
FIG. 9 is a side elevation similar to FIG. 8 and shows a second embodiment of said further development of the invention.

In the embodiment of FIG. 9, the axes 48 and 49 of the links 50 and 51 of the vacuum beams 52 and 53 lie exactly in the plane of the drawing, which is at right angles to the direction of travel of tube sections 54. These axes are relatively inclined toward the folding blades 55 and 56. A rotation from the position shown in the drawing results in a component of movement toward the transverse center plane of the bag tube. This is apparent from position 52', in which the upper vacuum beam 52 is shown in dash-dot lines after a rotation of 180°. In this arrangement, said component is zero at the beginning of the opening operation and subsequently increases. The course is thus substantially in accordance with the desired behavior determined by the behavior of the sheeting.

In this embodiment, the vacuum beams are parallel to the end edge of the tube section and the vacuum openings, which are not shown in the drawing, are also parallel to the side faces of the vacuum beams. To compensate the inclination, the suction surface of the vacuum beam is not parallel to the axis of rotation but parallel to the feeding plane. Instead of providing the vacuum beam with a machined oblique suction surface, a vacuum beam may be used in which the suction surface is at rght angles to the side faces and which is mounted on the links in a suitable oblique orientation.

In this embodiment the drive is also non-uniform so that the velocity of the component of movement in the direction of travel is equal to the speed of travel during the opening operation.

Figure 10:
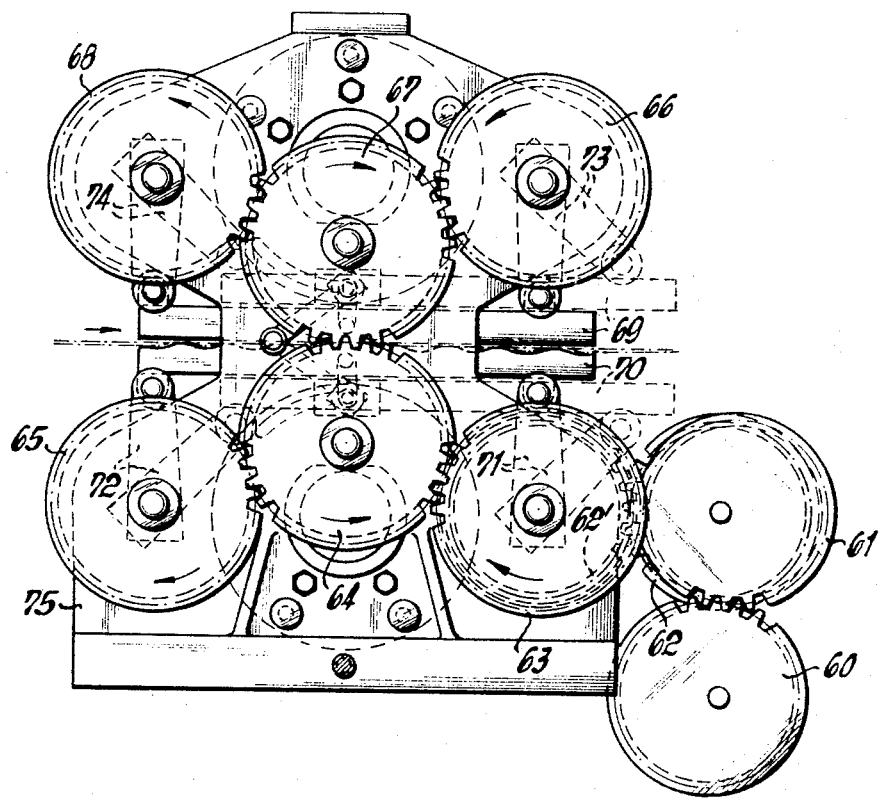
FIG. 10 is an elevation showing the entire pulling-open station with the varying-speed drive according to the invention.

FIG. 10 shows a transmission 60, 61 having elliptical gears for driving a complete vacuum opening station. The ellipitcal gear 60 is uniformly driven from the processing machine and produces a non-uniform rotation of the second ellipitcal gear 61, which is in mesh with the gear 60 and transmits the non-uniform motion by the gear train 62, 62' to the meshing spur gears 63 to 68. The spur gears 63, 65, 66 and 68 drive the links 71 to 74, which carry the vacuum beams 69 and 70. In FIG. 10, an obliquity of the axes of the links is not shown for convenience. In case of an obliquity according to the first embodiment it would be sufficient to give a corresponding oblique orientation to the side frame 75 of the machine, which frame serves for mounting the opening mechanism, and to give the gears 62, 62' a slightly beveled shape in view of the inclination relative to the normally arranged gears 60, 61 and 62.

In an oblique arrangement according to the second embodiment, the side frame 75 of the machine would have to be split approximately in the feeding plane so that the corresponding upper and lower halves could be set at different inclinations from the vertical as shown in FIG. 9. In this case, gears 62, 62' must consist of slightly crossing skew gears, and meshing bevel gears must be coaxially associated with the spur gears 64 and 67. The spur gears 64 and 67, which constitute only a driving connection between spur gears 65 and 63, on the one hand, and 68 and 66, on the other hand, should be dimensioned so that they do not mesh with each other. It will be understood that the drive may alternatively be transmitted from a vertical drive shafts by means of two bevel gear trains separately to the lower and upper if the varying-ratio transmission precedes the vertical shaft.

Like any varying-ratio transmission, the transmission having elliptical gears produces phases of accelerated and retarded rotation during one revolution. The elliptical gears perform a revolution in unison with the vacuum beam. The elliptical gears are so related to the position of the vacuum beams that the accelerating phase is performed during the opening operation. This results in the desired increase of the speed of the vacuum beams so that the component of movement in the direction of travel is sufficiently equalized to the speed of travel of the workpiece during the opening operation.

What is claimed is:

1. Apparatus for pulling open the ends of tube sections of plastics material sheeting, which apparatus comprises two vacuum tools, preferably vacuum beams, which revolve in opposite senses and have vacuum openings, characterized in that the lower vacuum tool has waves, which extend at right angles to the open edge of the tube section, the vacuum openings of this vacuum tool are arranged in the wave troughs, and the vacuum openings of the upper vacuum tool are in registry with the wave crests of the lower vacuum tool.

2. Apparatus according to claim 1, characterized in that the vacuum line for the lower vacuum tool is opened before the vacuum line of the upper vacuum tool.

3. Apparatus according to claim 2, which comprises vacuum beams revolving on cranks, characterized in that the vacuum line for the lower vacuum beam is opened when the links are at an angle of 5° before the position corresponding to the closed position of the vacuum beams and the other vacuum line is opened when this closed position is reached.

4. Apparatus according to claim 1, characterized in that the wave troughs are progressively reduced in depth from the outer end to the inner end of the lower vacuum tools.

5. Apparatus according to claim 4, characterized in that each wave trough comprises two or more vacuum openings, which are spaced along the wave trough.

6. Apparatus according to claim 5, characterized in that vacuum lines for the groups of vacuum openings lying on the same level in the wave troughs of the vacuum tool and said lines are connected to separate vacuum sources.

7. Apparatus according to claim 5, characterized by a vacuum valve for delaying the application of the vacuum to the outer vacuum openings relative to the inner vacuum openings.

8. Apparatus according to claim 4, characterized in that the vacuum beam forming the lower vacuum tool consists of a quadrangular steel section, which is beveled on the suction side in accordance with the desired reduction of the depth of the wave troughs, and components which are wedge-shaped in the longitudinal direction and curved in cross-section are mounted on said steel section to form the wave crests.

9. Apparatus according to claim 8, characterized in that the wave crests protrude beyond the outer ends of the vacuum beams.

10. Apparatus according to claim 1, wherein cranks are provided for imparting a parallel movement to the vacuum beams, and the axes of the cranks are oblique to the transverse direction of the feeding plane and the vacuum beams are driven at an angular velocity which varies in such a manner that their component of velocity in the direction of travel of the workpieces is substantially constant during the opening operation.

11. Apparatus according to claim 10, characterized in that the axes of the cranks for imparting a parallel movement to the vacuum beams have such an oblique orientation in planes which are parallel to the feeding plane that a component toward the folding blades is imparted to the vacuum beams.

12. Apparatus according to claim 10, characterized in that the axes of the cranks for imparting parallel movements to the vacuum beams lie in planes that are at right angles to the direction of travel and to the feeding planes and are inclined in these planes towards the tube section.

13. Apparatus according to claim 10, wherein non-uniform movement is imparted to the vacuum beams by a varying-ratio transmission, e.g., a sliding crank drive or a transmission comprising elliptical gears, which is included in the means for driving said beams.

References Cited

UNITED STATES PATENTS 2,224,656 12/1940 Robinson _____ 93—28
3,006,256 10/1961 Rawe _____ 93—28

THERON E. CONDON, *Primary Examiner.*

U.S. Cl. X.R.

29—200, 421